(12) United States Patent
Van Staalduinen (10) Patent No.: US 11,540,451 B2
(45) Date of Patent: Jan. 3, 2023

(54) PRODUCT HOLDER ASSEMBLY

(71) Applicant: LOGIQS B.V., Maasdijk (NL)

(72) Inventor: Gerrit Johannes Van Staalduinen, Maasdijk (NL)

(73) Assignee: LOGIQS B.V., Maasdijk (NL)

(*) Notice: Subject to any disclaimer, the term of this patent is extended or adjusted under 35 U.S.C. 154(b) by 328 days.

(21) Appl. No.: 16/958,568

(22) PCT Filed: Feb. 13, 2019

(86) PCT No.: PCT/NL2019/050093
§ 371 (c)(1),
(2) Date: Jun. 26, 2020

(87) PCT Pub. No.: WO2019/160410
PCT Pub. Date: Aug. 22, 2019

(65) Prior Publication Data
US 2020/0337477 A1    Oct. 29, 2020

(30) Foreign Application Priority Data
Feb. 13, 2018 (NL) ...................... 2020432

(51) Int. Cl.
*A01G 9/02* (2018.01)
*A01G 9/029* (2018.01)
(Continued)

(52) U.S. Cl.
CPC ............. *A01G 9/0297* (2018.02); *A01G 9/02* (2013.01); *A47F 3/001* (2013.01); *A47F 7/0078* (2013.01); *A47F 11/04* (2013.01); *A01G 31/02* (2013.01)

(58) Field of Classification Search
CPC ........ A01G 9/02; A01G 9/029; A01G 9/0295; A01G 9/0297; A01G 31/00
See application file for complete search history.

(56) References Cited

U.S. PATENT DOCUMENTS 3,180,055 A * 4/1965 Ferrand ................ A01G 9/0297
47/77
4,159,597 A * 7/1979 Olsen ................... A01G 9/0297
217/26
(Continued)

FOREIGN PATENT DOCUMENTS

CN    104488671 A    4/2015
CN    206136854 U    5/2017
(Continued)

*Primary Examiner* — Michael H Wang
(74) *Attorney, Agent, or Firm* — Maschoff Brennan (57) ABSTRACT

A product holder assembly for a mobile cultivation of plants along a path in a hall includes a product holder having a bottom and an upstanding circumferential wall extending from the bottom, a first space extending from the bottom of the product holder along the wall to allow a medium or substrate for roots of the plants to receive nutriments and/or support from, a grid system arranged to be placed on the product holder to cover the first space in the product holder and to separate the first space from a second space adjacent to the grid system at a side of the grid system facing away from the first space, wherein the grid system is arranged for holding a plurality of separate plants, the roots of which to reach for the first space and the leaves of which to reach for the second space, wherein the grid system is arranged to operate in conjunction with an air duct system.

20 Claims, 4 Drawing Sheets

(51) Int. Cl.
*A47F 3/00* (2006.01)
*A47F 7/00* (2006.01)
*A47F 11/04* (2006.01)
*A01G 31/02* (2006.01)

(56) References Cited

U.S. PATENT DOCUMENTS

| | | | | |
|---|---|---|---|---|
| 4,603,506 | A * | 8/1986 | Powell, Jr. | A01G 31/00 47/62 E |
| 5,136,804 | A * | 8/1992 | Rothem | A01G 31/02 47/60 |
| 5,675,932 | A * | 10/1997 | Mauney | A01G 31/02 47/17 |
| 7,350,331 | B1 * | 4/2008 | Gontier | A61P 43/00 47/59 R |
| 8,448,379 | B2 * | 5/2013 | Igarashi | A01G 31/06 47/62 R |
| 9,807,949 | B2 * | 11/2017 | Hamlin | A01G 31/02 |
| 10,314,251 | B2 * | 6/2019 | Gagne | A01G 9/247 |
| 2016/0157447 | A1 * | 6/2016 | Hanzawa | A01G 9/247 47/60 |
| 2016/0235023 | A1 | 8/2016 | Thoma et al. | |
| 2017/0142912 | A1 * | 5/2017 | Gasmer | A01G 9/083 |
| 2019/0021249 | A1 * | 1/2019 | Ivanescu | A01G 9/045 |
| 2019/0261587 | A1 * | 8/2019 | Abe | A01G 31/02 |
| 2022/0210983 | A1 * | 7/2022 | Mannoni | A01G 9/0295 |

FOREIGN PATENT DOCUMENTS

CN 206227267 U 6/2017
CN 206776376 U 12/2017

\* cited by examiner

PRODUCT HOLDER ASSEMBLY

The present invention relates to a product holder assembly for a mobile cultivation of plants along at least one path in a hall, which assembly is provided with:
- a product holder having a bottom and an upstanding circumferential wall extending from the bottom,
- a first space extending from the bottom of the product holder along the wall to allow a medium or substrate for roots of the plants to receive nutriments and/or support from,
- a grid system arranged to be placed on the product holder to cover the first space in the product holder and to separate the first space from a second space adjacent to the grid system at a side of the grid system facing away from the first space, wherein the grid system is arranged for holding a plurality of separate plants, the roots of which to reach for the first space and the leafs of which to reach for the second space.

Such a product holder assembly is known in the art and it is used for cultivation of crops and plants, typically in halls and in particular in breeding halls and green houses. During the process of cultivation, a plurality of product holder assemblies are moved due to logistic optimalization of the growth of plants in other product holder assemblies locating in the hall. Because some of the product holder assemblies are carrying plants which are ready for sales and transport to a market outside the hall, while other product holder assemblies are carrying plants which are just in the first phase of growing up. The cultivation of crops and plants takes place in mass production and therefor, grid systems are arranged to set as much plants relative to each other as possible.

In this field of expertise, the mobile cultivation of plants is associated with cultivation of plants in a hall in which the plants need to be transported a few times during the process of cultivation or growing until the plants may leave the hall for example for sales or for delivery to a customer. In such cultivation conditions, transport of the plants is to be alternated with stays of the plants which take normally much longer than the time needed for transport. The mobile cultivation may alternatively be called moving cultivation, revolving cultivation, or rotating cultivation.

It is a problem of such mobile cultivation that the plants suffer, during a relative longer stay in the hall, from conditions which are not ideal for the growth of the plants. The growth of plants depends, among others, on the quality of air around the plants, such as around the roots and around the leafs of the plants. For example, the humidity of air may influence the growth of bacterias at the plants causing a bad condition for the process of growing. In mobile cultivation systems in the state of the art, a solution for this problem is still not recognized. All in all, the growing process of the plants present on a product holder assembly in the hall for mobile cultivation is difficult to manage from logistic point of view.

It is an object of the invention to alleviate this problem.

To this end, a product holder assembly according to the preamble is characterized in that the grid system is arranged to operate in conjunction with an air duct system, wherein the air duct system is connectable with an external air supply system to cause an overpressure in the air duct system relative to the second space, and wherein the grid system is adapted to direct a flow of air from the grid system into the second space along the plants.

In this way, a flow of air may be generated from the product holder assembly for a mobile cultivation of crops such as plants and potted plants, into the second space so as to flow along the plants present in the product holder assembly. The overpressure present in the air duct system causes the flow of air generated from the air duct system. The air duct system is arranged to be operated in conjunction with the grid system, so that air properties of the flow of air along the plants is substantially similar for all the plants hold by the grid system. Because of that, all the plants hold by the grid system are exposed to substantial similar growing conditions so that the speed of growing of the plants may be controlled, even tough the plants are growing in a mobile cultivation on the product holder assembly locating in the hall.

According to another embodiment, the grid system is formed by a plate comprising a plurality of first apertures, each of which being arranged for holding at least one plant, wherein the plurality of first apertures form a predetermined pattern of first apertures spaced apart according to predetermined distances.

Mutual distances of plants are calculated to reach optimal growth of the plants at a minimum of costs, taking into account scarcely available room for cultivation, especially in a metropolis environment. To allow the plants locating at the product holder assembly according to the optimal growth condition, the first apertures allow a flow of air towards the second space at least along the stem of the plant present in the grid system.

According to another embodiment, the air duct system is arranged in the first space of the product holder assembly.

In this way, a flow of air may be generated from the air supply system through the air duct system via the first space towards the second space thereby causing the flow of air to interact with the climate present in the first space, such as an exchange of temperature, so as to achieve an optimal condition for the flow of air in the second space perfectly matching with the condition for the leafs of the plants.

According to another embodiment, the plate of the grid system comprises a plurality of second apertures, each of which being arranged for passage of the flow of air guided by the air duct system.

In this way, the flow of air generated by the air supply system may be distributed above the grid system so as to cause a further flow of air flowing substantially transverse, such as, when the grid system is positioned in horizontal position, vertical or upward from the grid system in a constant composition causing an environment or climate which is constantly distributed and stable for the growing process of the plants or at least the leafs of the plants.

According to a favourable embodiment, each of the plurality of first apertures is associated with a third space enclosed by a peripheral wall, wherein the peripheral wall:
i) extends towards the bottom from a side of the grid system facing the first space,
ii) is configured to reach into medium or a substrate,
iii) is configured for allowing medium to enter the third space.

In this way, by reducing or eliminating flow of air through first apertures, the product holder assembly is able to provide more uniform climate for plants present in the plurality of first apertures of the product holder assembly thereby reducing variation of growth between plants.

According to another embodiment, the air duct system is arranged at the side of the grid system facing the first space.

In this way, the air duct system present in the first space is easy to release from the product holder assembly and thus for example cleaning of the air duct system becomes easy as well.

According to another embodiment, the air duct system extends between the grid system and a further grid system arranged at the side of the grid system facing away from the second space, wherein the further grid system is formed by a further plate comprising a plurality of further apertures corresponding to the first apertures, each of which being arranged for holding at least one plant.

In this way, the further grid system is positioned in the first space. As such, the air duct system is formed by means of the plate and the further plate, both of which allow simple releasing and cleaning thereof.

According to another embodiment, the air duct system is fixed to the side of the grid system facing away from the second space, wherein the air duct system comprises a series of third outlet openings arranged at top sides at locations corresponding to the second apertures arranged in the grid system so as to direct the flow of air upward through the grid system towards and into the second space.

In this way, the air duct system is easy to release from the product holder assembly and thus for example cleaning of the air duct system becomes easy as well.

According to another embodiment, the air duct system is locating at the bottom side of the first space.

In this way, the entire area in which the roots of the plants are reaching out is capable of being in fluid communication of the air supply system.

According to another embodiment, the air duct system comprises a series of first outlet openings arranged at lateral sides so as to direct the flow of air sideways along the side of the grid system facing the first space.

In this way, some air is capable of direct interacting with the roots of the plants locating in the first space.

According to another embodiment, the air duct system is arranged at the side of the grid system facing the second space and wherein the air duct system comprises a series of second outlet openings arranged at lateral sides so as to direct the flow of air sideways along the side of the grid system facing the first space.

In this way, the air duct system present in the second space is easy to release from the product holder assembly and thus for example cleaning of the air duct system becomes easy as well.

According to another embodiment, the air duct system is equipped with first connection means to cooperate with second connection means of the air supply system arranged along the path along which the product holder assembly is to be moved.

In this way, the product holder assembly becomes connectable to the external air supply system at any location in the hall at which the further air duct system provides the second connection means.

According to another embodiment, the first connection means is formed by at least one extending tube arranged to connect with the second connection means formed by a series of sealings protrudable by the at least one tube when placed at a predetermined location along the path.

In this way, the air duct system is capable of being set in fluid communication with the further duct system including the external air supply system so as to provide a flow of air into the second space relative to the product holder assembly. As soon as the product holder assembly is positioned along the path at a predetermined location in which the first connection means is aligned with the second connection means, it may be lowered down while the air duct system is connected to the further air duct system by the downwardly extending tube penetrating a corresponding sealing of the second connection means providing an immediate plug-in to the further air duct system for causing a flow of air towards the second space.

According to another embodiment, the grid system is a plate of metal and a side of the plate arranged to face the second space is polished, or wherein the grid system is a plate which is at a side of the grid system arranged to face the second space coated with a reflective layer.

In this way, light radiated on the leafs of the plants reaching out in the second space, is at least partly reflectable towards the leafs so that the speed of growing of the plants may increase.

According to another embodiment, the air supply system comprises an air supply controller to adjust the overpressure to be generated to either increase or decrease the speed of the flow of air along the plants hold by the grid system.

In this way, the condition of the plants hold by the grid system of the corresponding product holder assembly may be controlled. For example in case the plants hold by the grid system is behind schedule relative to other plants hold by an other grid system present in the green house, the condition of the plants may be means of adjusting the flow of air caused by the air supply system.

Finally, the present invention relates to product holder assembly system to be arranged in a hall for cultivation of plants, comprising an air supply system, and a controller to control the air supply system to distribute a flow of air to the product holder assembly according to any of the preceding claims, wherein the first connection means of the air duct system of the product holder assembly is arranged to cooperate with second connection means of air supply system arranged along the path along which the product holder assembly is to be moved.

In this way, the product holder assembly system becomes connectable to each of the product holder assemblies arranged along the path at any location thereof.

The present invention will now be illustrated with reference to the drawing where.

Figure 1A:
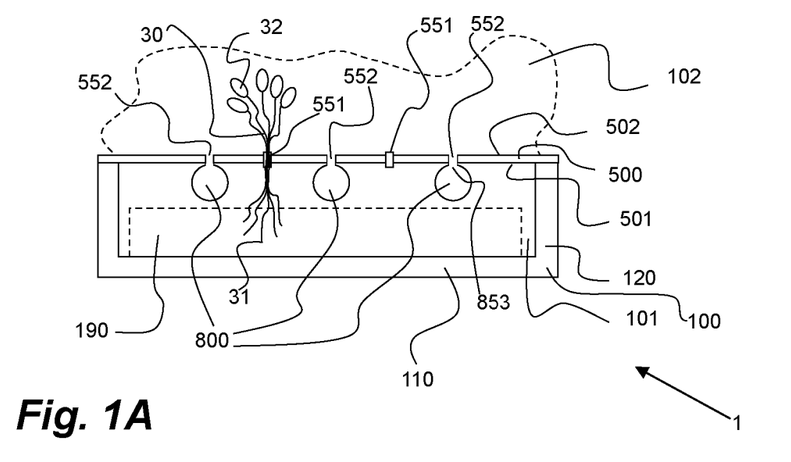
FIG. 1a shows a cross sectional view of the product holder assembly in a first embodiment according to the invention including an air duct system.

FIG. 1A shows a first embodiment of the product holder assembly 1 according to the invention. The product holder assembly 1 is arranged to provide cultivation of crops and plants 30, typically in halls and in particular in breeding halls and green houses. During the process of cultivation, some of a plurality of product holder assemblies sometimes need to be moved along a predetermined path 6 in the hall, mostly because of logistic optimalization in conjunction with other product holder assemblies locating in the hall. Some of the product holder assemblies are carrying plants which are ready for sales and transport to a market outside the hall, while other product holder assemblies are carrying plants which are just in the first phase of growing up.

According to the invention, the assembly 1 is equipped with an air duct system 800 which is arranged to provide or allow a climate in the second space which is favourable for the plant or the leafs of the plant being present in the second space. The climate in the second space may be determined by a flow of air generated by an air supply system 900. In this example, the air supply system 900 is arranged externally from the product holder assembly 1 or spaced apart from the product holder assembly 1.

Figure 6:
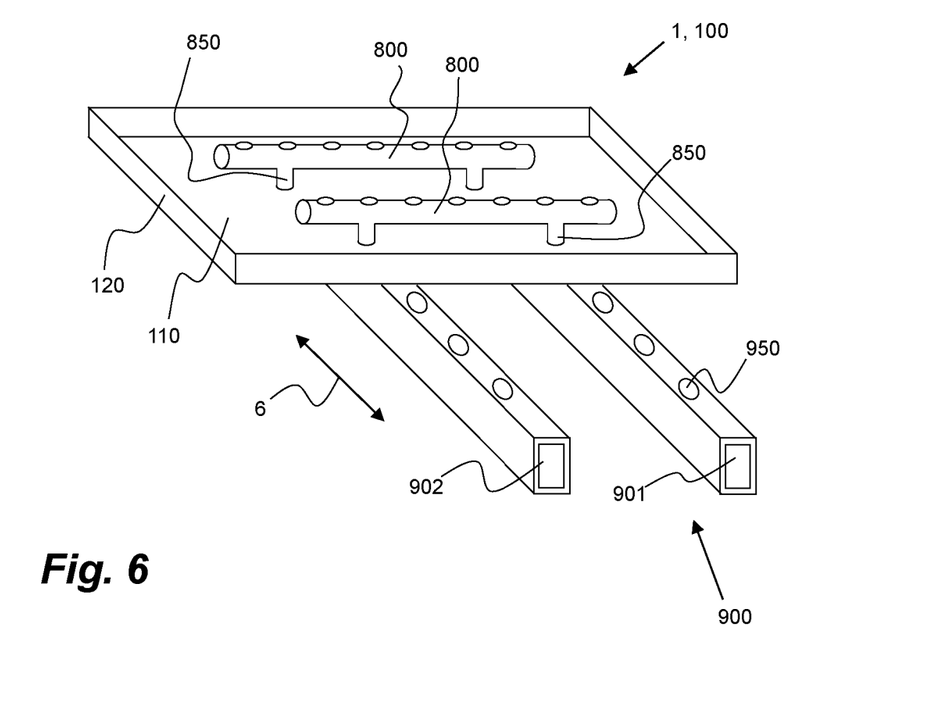
FIG. 6 shows a perspective view of the product holder including an air duct system according to the invention.

Referring to FIG. 6, the product holder assembly 1 carries the air duct system 800 which is connectable with the air supply system 900. The air supply system 900 is in this example formed by a piping system, in this example formed by pipes 901, 902 arranged along the path 6. At each position the product holder assembly 1 is positioned, the air duct system 800 is connectable with the air supply system 900 via at least one of the pipes 901, 902.

Figure 7:
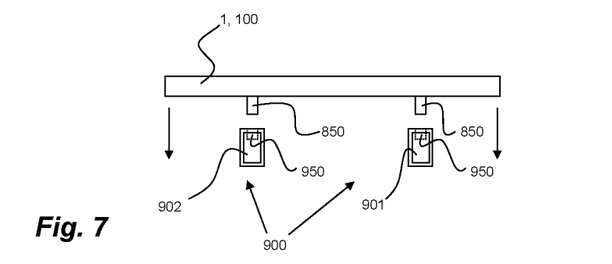
FIG. 7 shows a side view of the product holder including an air duct system according to the invention, the product holder being in a first position relative to an air supply system.

Referring to FIG. 7, the product holder assembly 1 is located in a first vertical position relative to the path 6 and/or the air supply system 900. The product holder assembly 1 being in this first position, is not connected with the air supply system 900 and is, in other words, not in fluid communication therewith. The product holder assembly being in its first vertical position is typically a position in which it allows transport or conveyance along the path 6 from one location in the hall to a second location in hall.

Figure 8:
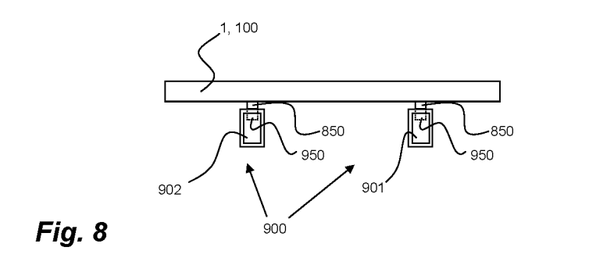
FIG. 8 shows a side view of the product holder including an air duct system according to the invention, the product holder being in a second position relative to the air supply system.

When the product holder assembly 1 has arrived at a location in the hall in which it needs to be stored, or at least to be temporary stored, for example to allow a further growing of the plants carried by said product holder assembly 1, the product holder assembly 1 needs to be lowered down into a second vertical position shown in FIG. 8. At the same time the product holder assembly 1 is lowered down, first connection means 850 of the air duct system 800 protruding downward, are arranged to penetrate into the air supply system 900, specifically at the second connection means 950, thereby coupling the air duct system 800 with the air supply system 900 to cause a fluid communication between both the air duct system 800 and the air supply system 900.

Referring back to FIG. 1, the product holder assembly 1 is provided with a product holder 100, having a bottom 110 and an upstanding circumferential wall 120 extending from the bottom 110. A first space 101 extends from the bottom 110 of the product holder 100 along the wall 120 to allow a medium 190 or substrate 190 for roots 31 of the plants 30 to receive nutriments and/or support from. A grid system 500 is arranged to be placed on the product holder 100 to cover the first space 101 in the product holder 100 and to separate the first space 101 from a second space 102 adjacent to the grid system 500 at a side 502 of the grid system 500 facing away from the first space 101. The grid system 500 is arranged for holding a plurality of separate plants 30, the roots 31 of which to reach for the first space 101 and the leafs 32 of which to reach for the second space 102.

According to the invention, the grid system 500 is arranged to operate in conjunction with an air duct system 800. The air duct system 800 is connectable with an external air supply system 900 to cause an overpressure in the air duct system 800 relative to the second space 102. The grid system 500 is adapted to direct a flow of air from the grid system 500 into the second space 102 along the plants 30. According to the invention, a flow of air is achieved which flows into the second space, away from the grid system 500 in a direction which is substantially transverse to the grid system 500 or, rather the surface or the side 502 of the grid system 500 facing away from the first space 101. In this way, a suitable climate or environment in which at least the leafs 32 of the plants 30 are locating, can be achieved.

Figure 1B:
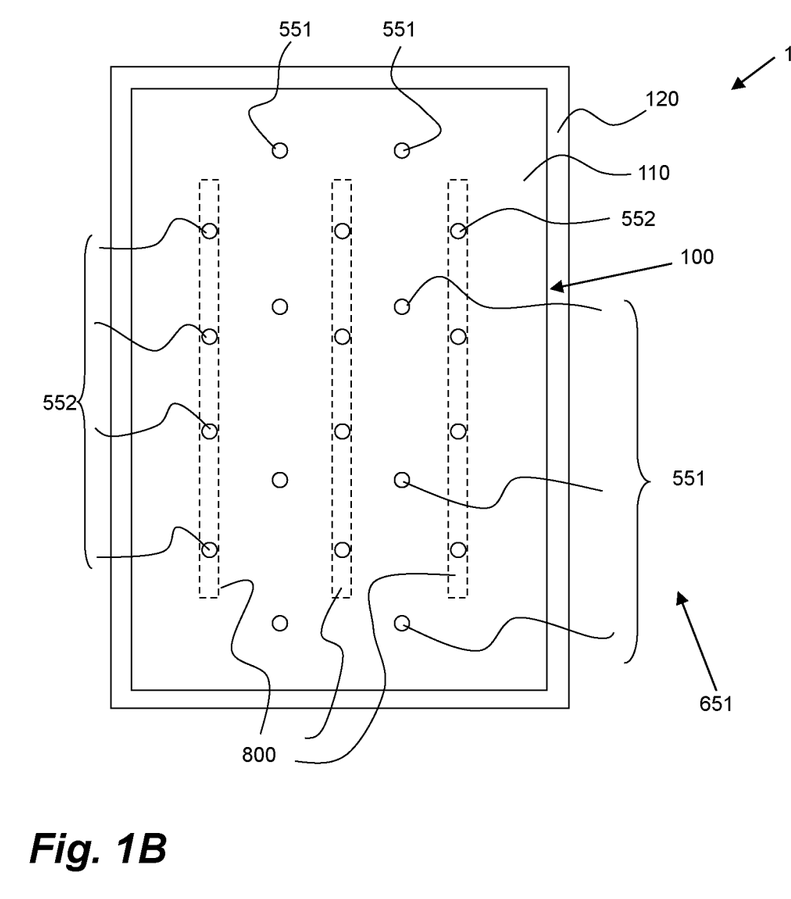
FIG. 1b shows a top view of the product holder assembly in a first embodiment according to the invention including an air duct system.

At the start of the cultivation of one plant 30, the plant 30 is hold or a kind of fixed at first apertures 551 locating in the grid system 500. The grid system 500 is formed by a plate comprising a plurality of said first apertures 551, each of which being arranged for holding at least one plant 30. FIG. 1B shows the plurality of first apertures 551 forming a predetermined first pattern 561 of first apertures 551 spaced apart according to predetermined distances. In such arrangement, the roots 31 of the plant 30 reach for the first space 101 in which a medium or substrate is located. The medium may be water including nutriments to be received and/or transported by the roots 31 of the plants 30. The medium may be steel wool which provide a kind of support for the roots 31 to rest upon. The medium may be a suitable combination thereof as well.

FIG. 1A shows an example wherein the air duct system 800 is arranged in the first space 101 of the product holder assembly 1. A flow of air generated from the air supply system 900 flows through the air duct system 800 towards the second space 102 thereby causing immediate contact of the flow of air with the leafs of the plant reaching out in the second space so as to obtain direct control on the climate or environment in which the leafs of the plants are locating.

In this example, the grid system 500 comprises a plurality of second apertures 552, each of which being arranged for passage of the flow of air guided by the air duct system 800.

Figure 4:
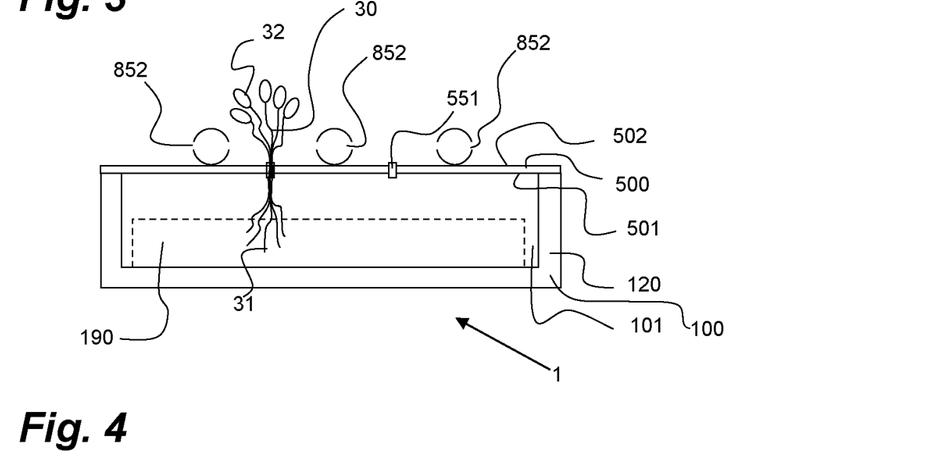
FIG. 4 shows a cross sectional view of the product holder assembly in a fourth embodiment according to the invention including an air duct system.
Figure 5:
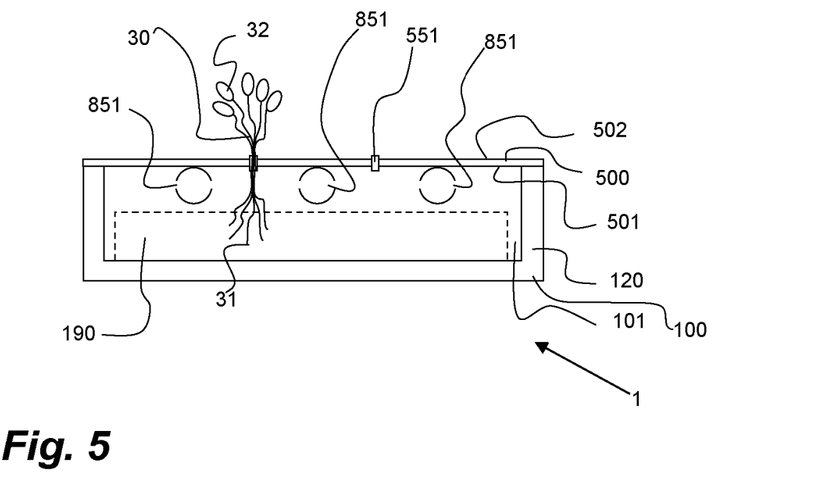
FIG. 5 shows a cross sectional view of the product holder assembly in a fifth embodiment according to the invention including an air duct system.

Referring now to FIG. 5, wherein the air duct system 800 is provided with first outlet openings 851 capable of discharging supplied air in the first space 101 in a lateral direction or parallel to the surface of the grid system 500, and referring now to FIG. 4, wherein the air duct system 800 is provided with second outlet openings 852 capable of discharging supplied air in the second space 102 in a lateral direction or parallel to the surface of the grid system 500, the air duct system 800 according to FIG. 1 is provided with third outlet openings 853 capable of discharging supplied air in the second space 102 via the second apertures 552 arranged in the grid system 500 or in the plate thereof. As a matter of fact, in this example, said second apertures 552 coincide with the third outlet openings 853 of the air duct system 800.

Figure 2:
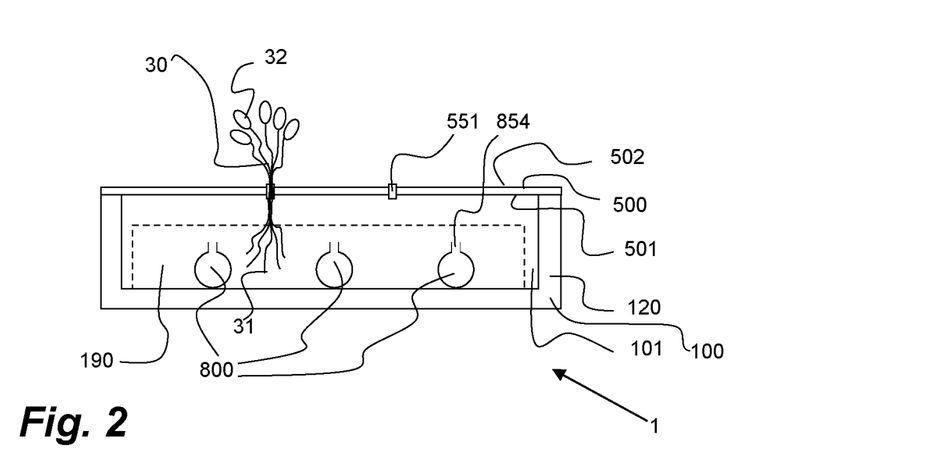
FIG. 2 shows a cross sectional view of the product holder assembly in a second embodiment according to the invention including an air duct system.

FIG. 2 shows a second embodiment of the product holder assembly 1 according to the invention. The air duct system 800 is arranged in the first space 101 of the product holder assembly 1. Specifically, the air duct system 800 is locating at the bottom side 110 of the first space 101. In this example, the air duct system 800 according to FIG. 2 is provided with fourth outlet openings 854 capable of discharging supplied air in the first space 101 towards the second space 102 via the first apertures 551 arranged in the grid system 500 or in the plate thereof.

Figure 3:
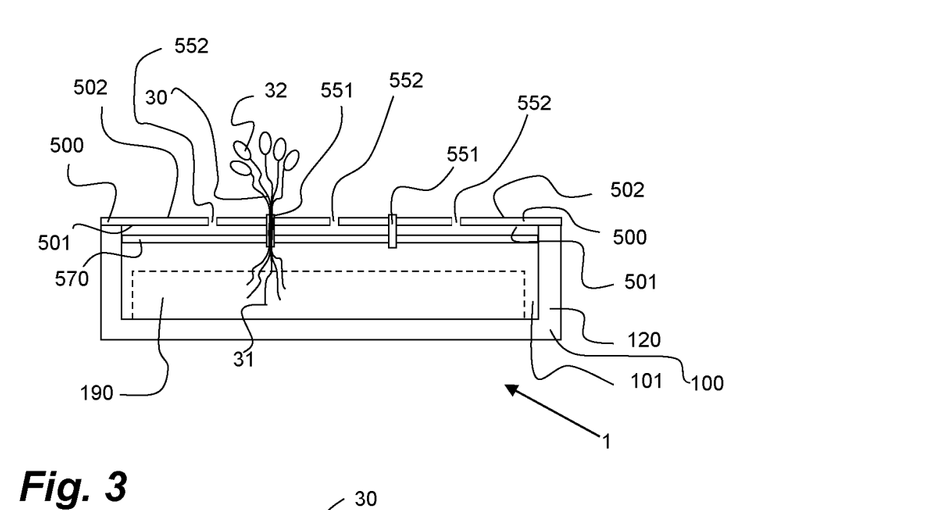
FIG. 3 shows a cross sectional view of the product holder assembly in a third embodiment according to the invention including an air duct system.

FIG. 3 shows a third embodiment of the product holder assembly according to the invention. The air duct system 800 extends between the grid system 500 and a further grid system 570 arranged at the side 501 of the grid system 500 facing away from the second space 102. The further grid system 570 is formed by a further plate comprising a plurality of further apertures corresponding to the first apertures 551, each of which being arranged for holding at least one plant. In this example, the grid system 500 and the further grid system 570 enclose a space which is in fluid communication with the air supply system 900 so as to allow a flow of air into the second space 102 having a flow direction which is substantially transverse to the grid system 500 causing a constant flow from the grid system 500.

FIG. 4 shows a fourth embodiment of the product holder assembly according to the invention. The air duct system 800 is arranged at the side 502 of the grid system 500 facing the second space 102. The air duct system 800 comprises a series of second outlet openings 852 arranged at lateral sides so as to direct the flow of air sideways along the side 502 of the grid system 500 facing the first space 101.

FIG. 5 shows a fifth embodiment of the product holder assembly according to the invention. The air duct system 800 comprises a series of first outlet openings 851 arranged at lateral sides so as to direct the flow of air sideways along the side 501 of the grid system 500 facing the first space 101. The flow of air discharged in the first space 101 is capable of flowing through the series of first outlet openings 851 along the stem of the plants.

FIG. 6 shows the product holder assembly 1 including an air duct system 800 situated above an air supply system 900. The air duct system 800 is equipped with first connection means 850 to cooperate with second connection means 950 of the air supply system 900 arranged along the path 6 along which the product holder assembly 1 is to be moved. As a result, the air duct system 800 is connectable with the air supply system 900. As described, the air supply system 900 is in this example formed by a piping system, in this example formed by pipes 901, 902 arranged along the path 6. At each position the product holder assembly 1 is positioned, the air duct system 800 is connectable with the air supply system 900 via at least one of the pipes 901, 902. As described, the first connection means 850 of the air duct system 800 protruding downward, are arranged to penetrate into the air supply system 900 thereby coupling the air duct system 800 with the air supply system 900 to cause a fluid communication between both the air duct system 800 and the air supply system 900. To allow the first connection means 850 to penetrate into the air supply system 900, the second connection means 950 may be closure means 950 such as valves, which seal the air supply system 900 in absence of a first connection means, and which allow an opening of the air supply system 900 when the first connection means 850 actuates or opens the closure means 950.

Figure 9:
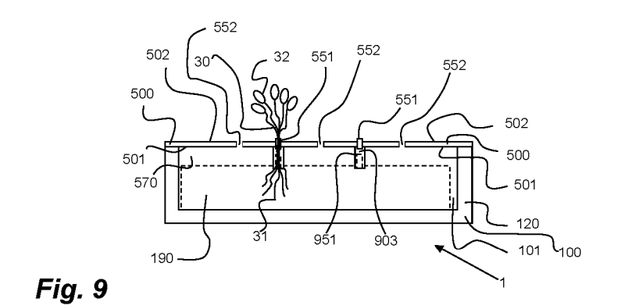
FIG. 9 shows a cross sectional view of the product holder assembly in a sixth embodiment according to the invention including an air duct system.

FIG. 9 shows a sixth embodiment of the product holder assembly 1 according to the invention. The air duct system 800 is arranged in the first space 101 of the product holder assembly 1. In this example, the air duct system 800 according to FIG. 9 is capable of discharging supplied air in the first space 101 towards the second space 102 via the second apertures 552 arranged in the grid system 500 or in the plate thereof. Each of the plurality of first apertures 551 is associated with a third space 903, which third space is enclosed by a peripheral wall 951 extending from a side 501 of the grid system 500 facing the first space 101. The peripheral wall is configured to reach into the medium and in use prevents discharging of air above the medium in the first space through the plurality of first apertures 551 into the second space 102. In use discharging of air through each of the plurality of apertures 551 is different caused for example by differences in shape and mass of stems and/or roots. This configuration ensures a more uniform further flow of air above the grid system 500 providing better climate for plants. Roots of plants are also isolated by the peripheral wall 951 from the air within the first space allowing establishment of a separate climate for the roots of plants, for example more humid air and/or higher level of medium.

The above example serves for illustrative purposes only. It will be clear to the person skilled in the art that various modifications are possible without leaving the scope of the claims.

The invention claimed is:

1. A product holder assembly for a mobile cultivation of plants along at least one path in a hall, the assembly comprising:
    a product holder having a bottom and an upstanding circumferential wall extending from the bottom,
    a first space extending from the bottom of the product holder along the wall to allow a medium or substrate for roots of the plants to receive nutriments and/or support from, and
    a grid system arranged to be placed on the product holder to cover the first space in the product holder and to separate the first space from a second space adjacent to the grid system at a side of the grid system facing away from the first space, wherein:
        the grid system is arranged for holding a plurality of separate plants, the roots of which to reach for the first space and the leaves of which to reach for the second space, wherein the grid system is arranged to operate in conjunction with an air duct system, wherein the air duct system is connectable with an external air supply system to cause an overpressure in the air duct system relative to the second space, and wherein the grid system is adapted to direct a flow of air from the grid system into the second space along the plants, and
        the grid system is formed by a plate including:
            a plurality of first apertures, each of which being arranged for holding at least on plants, wherein the plurality of first apertures form a predetermined pattern of first apertures spaced apart according to predetermined distances, and
            a plurality of second apertures, each of which being arranged for passage of the flow of air guided by the air duct system;
        wherein each of the plurality of first apertures is associated with a third space enclosed by a peripheral wall that:
            extends towards the bottom from a side of the grid system facing the first space,
            is configured to reach into the medium or substrate, and
            is configured for allowing medium to enter the third space.

2. The product holder assembly according to claim 1, wherein the air duct system is arranged in the first space of the product holder assembly.

3. The product holder assembly according to claim 2, wherein the air duct system is located at the bottom side of the first space.

4. The product holder assembly according to claim 3, wherein the air duct system is equipped with first connection means to cooperate with second connection means of the air supply system arranged along the path along which the product holder assembly is to be moved.

5. The product holder assembly according to claim 2, wherein the air duct system is arranged at the side of the grid system facing the first space.

6. The product holder assembly according to claim 5, wherein the air duct system is equipped with first connection means to cooperate with second connection means of the air supply system arranged along the path along which the product holder assembly is to be moved.

7. The product holder assembly according to claim 6, wherein the first connection means is formed by at least one extending tube arranged to connect with the second connection means formed by a series of sealings protrudable by the at least one tube when placed at a predetermined location along the path.

8. The product holder assembly according to claim 7, wherein the grid system is a plate of metal and a side of the plate arranged to face the second space is polished, or wherein the grid system is a plate which is at a side of the grid system arranged to face the second space coated with a reflective layer.

9. The product holder assembly according to claim 7, wherein the air supply system comprises an air supply controller to adjust the overpressure to be generated to either increase or decrease the speed of the flow of air along the plants hold by the grid system.

10. A product holder assembly system to be arranged in a hall for cultivation of plants, comprising:
the product holder assembly according to claim 6,
an air supply system, and
a controller to control the air supply system to distribute a flow of air to the product holder.

11. The product holder assembly according to claim 6, wherein the grid system is a plate of metal and a side of the plate arranged to face the second space is polished, or wherein the grid system is a plate which is at a side of the grid system arranged to face the second space coated with a reflective layer.

12. The product holder assembly according to claim 6, wherein the air supply system comprises an air supply controller to adjust the overpressure to be generated to either increase or decrease the speed of the flow of air along the plants hold by the grid system.

13. A product holder assembly system to be arranged in a hall for cultivation of plants, comprising:
the product holder assembly according to claim 2,
an air supply system, and
a controller to control the air supply system to distribute a flow of air to the product holder,
wherein the air duct system is equipped with first connection means to cooperate with second connections means of the air supply system arranged along the path along which the product holder assembly is to be moved.

14. The product holder assembly according to claim 2, wherein the air duct system is equipped with first connection means to cooperate with second connection means of the air supply system arranged along the path along which the product holder assembly is to be moved.

15. The product holder assembly according to claim 2, wherein the grid system is a plate of metal and a side of the plate arranged to face the second space is polished, or wherein the grid system is a plate which is at a side of the grid system arranged to face the second space coated with a reflective layer.

16. The product holder assembly according to claim 2, wherein the air supply system comprises an air supply controller to adjust the overpressure to be generated to either increase or decrease the speed of the flow of air along the plants hold by the grid system.

17. A product holder assembly system to be arranged in a hall for cultivation of plants, comprising:
the product holder assembly according to claim 1,
an air supply system, and
a controller to control the air supply system to distribute a flow of air to the product holder,
wherein first connection means of the air duct system of the product holder assembly is arranged to cooperate with second connection means of air supply system arranged along the path along which the product holder assembly is to be moved.

18. The product holder assembly according to claim 1, wherein the air duct system is equipped with first connection means to cooperate with second connection means of the air supply system arranged along the path along which the product holder assembly is to be moved.

19. The product holder assembly according to claim 1, wherein the grid system is a plate of metal and a side of the plate arranged to face the second space is polished, or wherein the grid system is a plate which is at a side of the grid system arranged to face the second space coated with a reflective layer.

20. The product holder assembly according to claim 1, wherein the air supply system comprises an air supply controller to adjust the overpressure to be generated to either increase or decrease the speed of the flow of air along the plants hold by the grid system.

* * * * *